April 29, 1958     D. C. KINNEY ET AL     2,832,326
AIR COOLED ENGINE CONSTRUCTION
Filed Nov. 29, 1954     4 Sheets-Sheet 4

INVENTORS
David C. Kinney
Daniel L. Donovan.
BY Hauker Hardesty
Attorneys.

United States Patent Office 2,832,326
Patented Apr. 29, 1958

2,832,326

AIR COOLED ENGINE CONSTRUCTION

David C. Kinney, East Detroit, and Daniel L. Donovan, Hazel Park, Mich., assignors to Continental Motors Corporation, Detroit and Muskegon, Mich., a corporation of Virginia Application November 29, 1954, Serial No. 471,691

3 Claims. (Cl. 123—41.31)

This invention relates to an internal combustion engine cooling construction and more particularly to an air cooled engine made of light weight materials embodying structural cooling features integrally formed and combined, of novel and inventive character.

The internal combustion engine of the invention is one particularly suitable and adaptable for use where moderate loads are present. Such an engine would be used on power driven lawn mowers, or hand controlled tractors, or the like. Air cooling requires that a large area of the external walls of the engine be presented to the atmosphere. Formation of such walls and air cooled surfaces demands considerable ingenuity in order to meet and satisfy the structural and functional requirements of the engine elements.

The instant invention therefore has for an object the provision of increased air cooling surfaces on the outer walls of the engine, the provision of air cooling passageways to and from the internal moving components of the engine, the provision of a compact, integrated engine having a maximum of air cooling surfaces for its moving parts, the provision of air cooling structural features without any diminution of the essential requirements for an internal combustion engine, and the provision of such air cooling features in an economical, efficient and practical manner.

These desirable advantages and features of construction are among the principal objects of the invention. Additional objects and structural elements will become more apparent from the description given below. For a visual understanding of the invention, reference is made to the accompanying drawings in which like parts are referred to by like reference numerals throughout the several views illustrating a preferred embodiment of the invention, and in which Fig. 1 is a top plan view of the internal combustion engine embodying the invention.

Fig. 5 is a detail sectional view taken substantially on the line 5—5 of Fig. 2.

Figure 1:
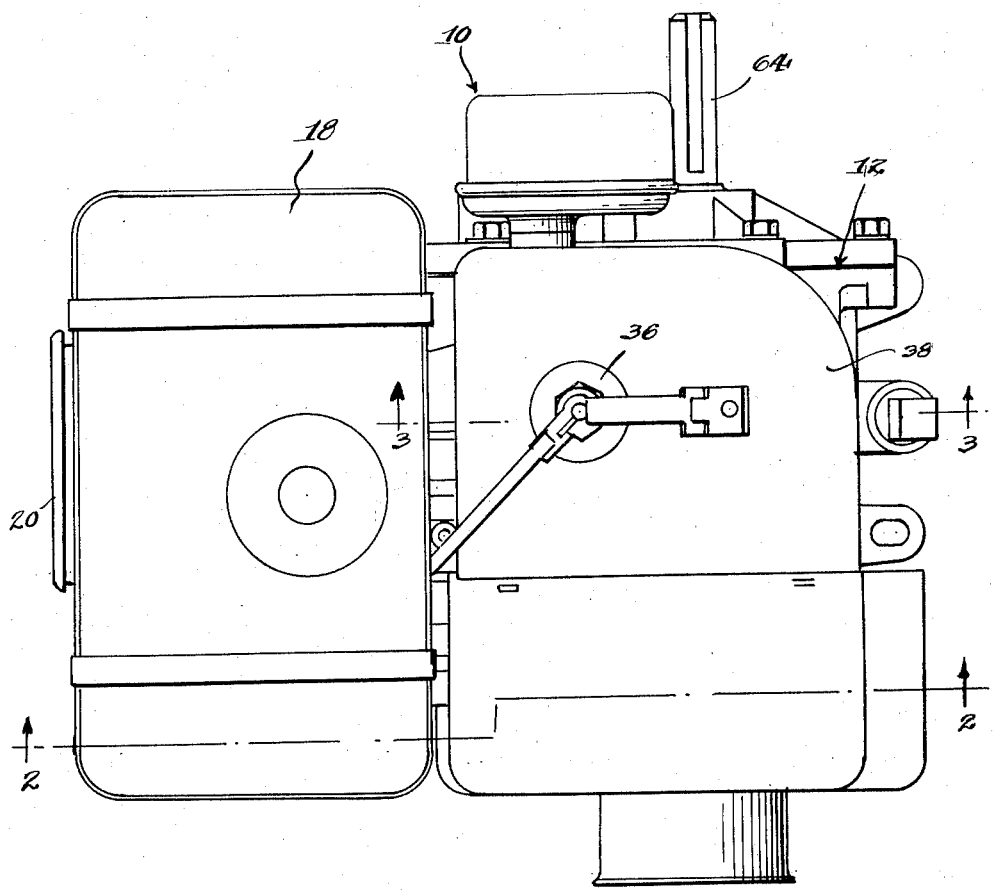
Figure 2:
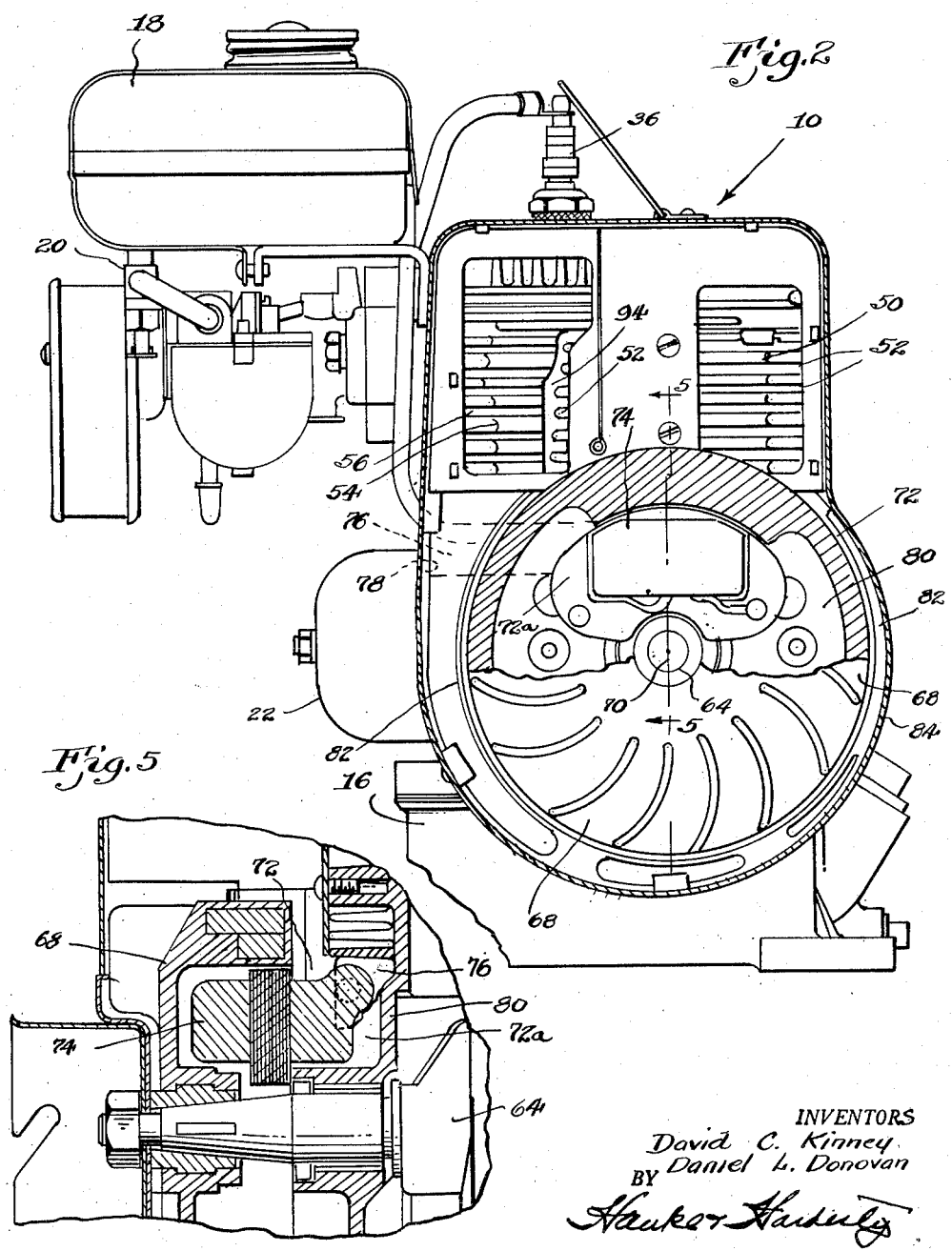
Fig. 2 is a side elevational view, partially in section, of the engine of Fig. 1, taken substantially on the line 2—2 of Fig. 1.
Figure 3:
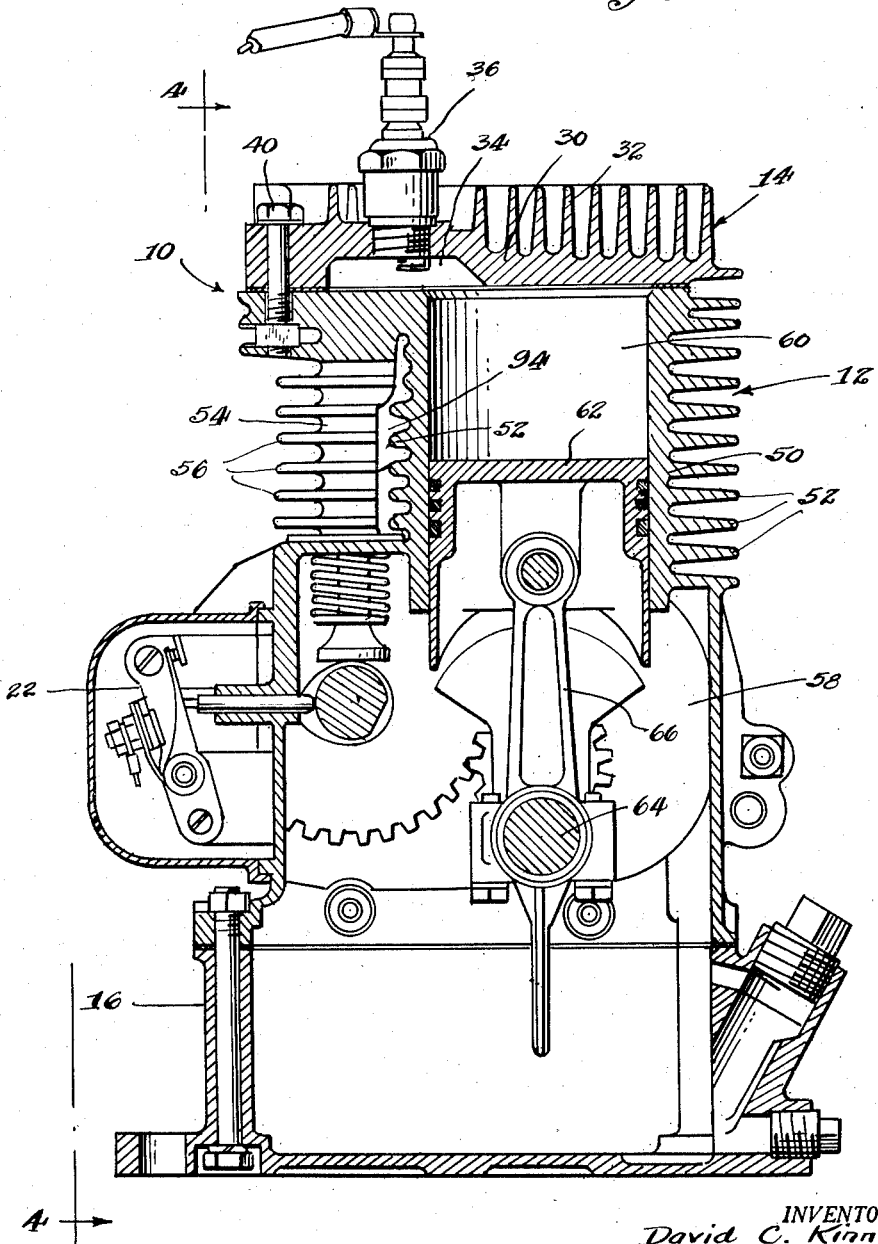
Fig. 3 is a vertical sectional view taken substantially on the line 3—3 of Fig. 1.
Figure 4:
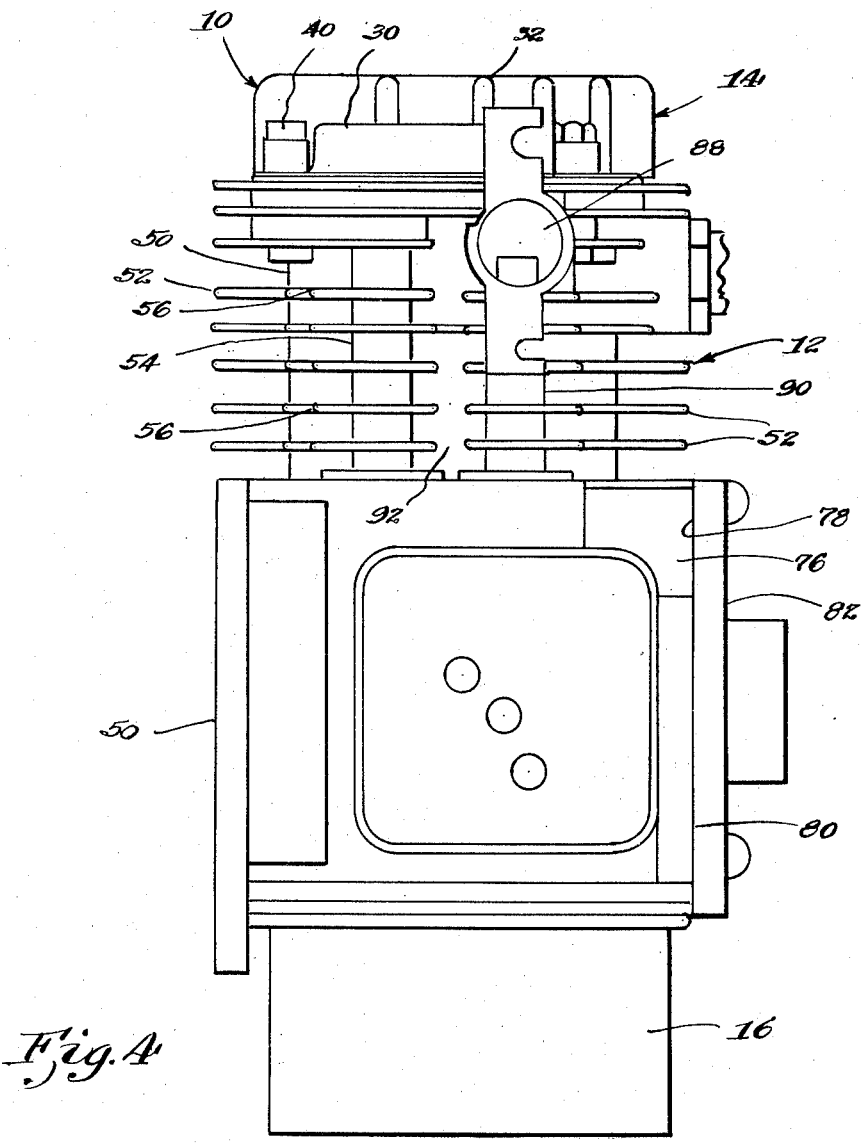
Fig. 4 is a side elevational view of the cylinder castings looking in the direction of the arrows marked 4—4 of Fig. 3

As shown in the drawings, the air cooled internal combustion engine 10 comprises a cylinder case or housing 12, a cylinder head 14, a crankcase 16, a fuel tank 18, a carburetor assembly 20, and a spark timing device 22. The engine 10 is designed to be mounted directly upon the device it is to drive or operate.

Cylinder head 14 comprises a main body element 30, air cooling fins 32, a combustion chamber 34, a spark ignition firing plug 36 threadedly mounted in the combustion chamber, and optionally an outer covering member 38. Cylinder head 14 is conjoined to the cylinder case 12 by bolts 40.

The crankcase 16, the fuel tank 18, the carburetor assembly 20 and the spark timing device 22 are mounted upon cylinder case 12 by suitable fastening means in the areas shown in the drawings. Cover shields may also be employed as required or desired, for protective purposes. Since these parts are not essential features of the invention, further detailed description is not deemed necessary.

Cylinder case or housing 12 comprises a main cylinder body element 50, air cooling fins 52 on the cylinder body element, valve guide elements 54, air cooling fins 56 on the valve guide elements, a crankcase area 58, a cylinder 60, a piston 62 in said cylinder, and piston drive means including a crankshaft 64 and a connecting rod 66.

A flywheel 68 is mounted at one end 70 of the crankshaft 64. The flywheel revolves in an air cooled chamber or recess 72, and a recess 72a is provided in which also the magneto coil 74 is mounted. Leading into the chamber 72 and directly to recess 72a, is a passageway 76 communicating with an opening 78 in the main body element 50. Magneto coil 74 is mounted directly to a wall 80 in chamber or recess 72a.

The flywheel 68 is positioned outwardly of the coil 74, and in its rotation on crankshaft 64 causes a movement of air within chamber 72. This structural arrangement provides an air current means for cooling the magneto coil 74, and the crankcase wall 80. Flywheel 68 rotates within a thin fin-like rib 82 which is eccentrically located with respect to the peripheral edge 84 of body element 50 at the flywheel end of the cylinder case 12.

In the upper portion of cylinder case 12, in the area adjacent the cylinder head 14 and above the crankcase area 58, are located the upper portions of cylinder 60 and the valve guide elements 54. A fuel intake passageway 88 leads to the intake valve 90 through one of the valve guide elements 54.

In order to more efficiently air cool the engine areas experiencing the greatest amount of heat, the individual exhaust and intake valve guide elements 54 are arranged with their own individual fins 56, which substantially surround the entire element. On the carburetor side of the valve guide elements 54 is an open spacing 92 between the fins 56 of the elements. Looking toward the flywheel side of the engine, an open spacing 94 is arranged between the valve guide elements 54 and their fins 56 and the cylinder body fins 52. Thus, the cylinder body 50 and the valve guide elements 54 are each individually provided with independent air cooling means, and yet the engine structure remains completely compact and integrated.

The cylinder case 12 and head 14 are preferably made of light weight structurally strong aluminum alloy having a high heat conductivity factor. The disposition of the air cooling fins, the separation of heat carrying component elements of the cylinder housing, and the compact arrangement of the magneto and flywheel outwardly of the end wall of the crankcase and provided with a recessed chamber having an air current passageway to the atmosphere comprise, among others, essential features of the inventive construction.

It will be apparent to those skilled in the art to which this invention pertains that various modifications and changes may be made without departing from the spirit of the invention or from the scope of the appended claims.

We claim:

1. In an air cooled internal combustion engine, a cylinder case or housing, a crankcase area in said housing, a housing wall defining one end of said crankcase area, a crankshaft bearing supported in said wall and rotatable on its axis arranged normal to the plane of said wall, said wall provided with a recess opening outwardly of said crankcase area, a magneto coil supported exteriorly on said wall and positioned partially in said recess, said housing having an air passage connecting said recess with the atmosphere, and a flywheel mounted on said crankshaft closely adjacent to and exteriorly of said magneto coil, whereby upon rotation of said flywheel air currents developed thereby are circulated through said passage and said recess in cooling relationship with said magneto coil.

2. In an air cooled internal combustion engine, a cylinder housing a crankcase area in said housing, a housing wall defining one end of said crankcase area, a rotatable crankshaft axially normal to and bearing supported in said wall, said wall having a recessed pocket opening outwardly of said wall and located above said crankshaft, a magneto coil supported by and affixed to said wall and positioned partially in said recess pocket, said housing wall provided with an air passage extending from said recess outwardly to the exterior of said housing, said passage disposed parallel to the plane of said wall, and a flywheel mounted on said crankcase outwardly of said magneto coil and closely adjacent thereto, whereby upon rotation of said flywheel air currents generated thereby circulate through said passage and said recessed pocket in cooling relationship with said magneto coil and over said wall defining one end of said crankcase area.

3. The engine structure defined in claim 2, in which said first wall is provided with an annular rib arranged integrally with said wall and closely adjacent the peripheral sweep of said flywheel in its rotation on said crankshaft, said annular rib together with said flywheel and said housing wall defining a chamber within which said air currents are circulated in said recessed pocket.

References Cited in the file of this patent
UNITED STATES PATENTS

| | | |
|---|---|---|
| 2,415,774 | Voorhies | Feb. 11, 1947 |
| 2,416,866 | Bronander | Mar. 4, 1947 |
| 2,438,669 | Krenzke | Mar. 30, 1948 |
| 2,525,375 | Ruzicka | Oct. 10, 1950 |
| 2,549,482 | Kiekhaefer | Apr. 17, 1951 |